Patented Oct. 29, 1940

2,219,313

UNITED STATES PATENT OFFICE 2,219,313

COMPOSITIONS FOR COLORING

Robert C. Hoare, Buffalo, N. Y., assignor to National Aniline & Chemical Company, Inc., New York, N. Y., a corporation of New York No Drawing. Application February 25, 1939, Serial No. 258,575

17 Claims. (Cl. 8—39)

This invention relates to improvements in coloring compositions. It relates particularly to improved printing compositions made from sulfonated anthraquinone dyestuffs, which compositions are especially useful for printing animal fibers such as wool and silk.

It is well known that many sulfonated anthraquinone dyestuffs (i. e., acid anthraquinone dyestuffs) are useful for dyeing wool and silk from aqueous baths but are ineffective when used for printing compositions. This difficulty is presumably due to the limited solubility of this type of dyestuff, since a much higher degree of solubility is required to make a good printing composition than is required for an aqueous dye bath, with the result that the dyestuffs do not penetrate fibrous materials sufficiently to yield satisfactory prints. The difficulty encountered in attempting to use sulfonated anthraquinone dyestuffs in printing pastes becomes especially pronounced in the presence of acids. The prints in such cases are frequently specky, weak, non-uniform, and useless.

It is an object of the present invention to provide compositions comprising sulfonated anthraquinone dyestuffs which compositions are adapted for use in dyeing and printing fibers such as wool and silk.

Another object of the invention is to provide compositions containing sulfonated anthraquinone dyestuffs which compositions are adapted to be dissolved in water to form solutions containing relatively high concentrations of said dyestuffs.

A further object of the invention is to provide printing pastes adapted for producing excellent prints on fibrous materials such as wool and silk, such pastes containing sulfonated anthraquinone dyestuffs that are ordinarily unsatisfactory for use in printing.

An additional object of the invention is to provide a process for increasing the solubility, particularly in acid aqueous media, of sulfonated anthraquinone dyestuffs which are normally of low solubility.

Other objects of the invention will in part be obvious and will in part appear hereinafter.

According to the present invention it has been found that when the said sulfonated anthraquinone dyestuffs are treated with xanthinic bases, particularly caffeine, the resulting compositions are characterized by unexpectedly higher solubility in aqueous media, and particularly in acid aqueous media. Such compositions are especially well suited for making printing pastes for use in the printing of animal fibers such as wool and silk. These printing pastes produce uniform bright prints of excellent quality. The invention includes the compositions consisting of the dyestuff and a xanthinic base, the printing pastes containing said compositions, and the process comprising treating a sulfonated anthraquinone dyestuff with a xanthinic base to increase its solubility.

The xanthinic bases are heterocyclic compounds having amphoteric properties. Caffeine, theobromine, xanthine, paraxanthine, theophylline, and epiquanine are representative examples of compounds of this class. It has been found that crude caffeine in the form in which it is extracted from coffee and tea is a particularly effective solubilizing agent for sulfonated anthraquinone dyestuffs.

The compositions of the invention can be prepared by merely mixing the xanthinic base with the sulfonated anthraquinone dyestuff in the dry state. On incorporating such a mixture in water, preferably hot water, the solubilizing action of the xanthinic base is brought into play to increase the solubility of the dyestuff. The proportions of xanthinic base and dyestuff required to produce the desired effect will vary depending upon the particular xanthinic base and dyestuff used, and also upon the manner in which the resulting composition is to be employed. When using caffeine it has been found that generally about one mol of caffeine per mol of actual dyestuff produces a satisfactorily solubilized dye composition. For practical purposes this ratio of caffeine to dyestuff can usually be obtained with sufficient accuracy by mixing the dyestuff with from about one-third to about one-half its weight of caffeine. More caffeine can be used without ill effect, but it is usually not required. When using other xanthinic bases, a molar ratio of base to dyestuff of one to one is also generally satisfactory. However, in some cases it may be found desirable to employ an amount of xanthinic base considerably in excess of the amount indicated by this ratio. In connection with the proportioning of the xanthinic base and dyestuff, it will be understood that under some conditions it may not be necessary or desirable to use an amount of base required to produce maximum solubility of dyestuff. Under these conditions there may be used a relatively small amount of the base to achieve only a small increase in solubility.

Printing compositions made up according to this invention may include in addition to the xanthinic bases the conventional components such as a thickener (e. g., gum tragacanth, locust bean gum, dextrine, or other thickeners), an organic acid (e. g., formic acid, acetic acid or propionic acid, etc.), or an inorganic acid (e. g., muriatic acid or sulfuric acid, etc.).

The sulfonated anthraquinone dyestuffs, also termed acid anthraquinone dyestuffs or anthraquinone alizarine colors, are anthraquinone sulfonic acids which contain (a) at least two hydroxyl groups or (b) at least one hydroxyl and at least one amino group or an amino group substituted by an alkyl or an aryl radical, or (c) at least two amino groups which may or may not be alkyl- or aryl- substituted amino groups. In other words, these dyestuffs are anthraquinone sulfonic acids containing at least two other substituents selected from the group consisting of the hydroxyl group, the amino group, and amino groups substituted by alkyl or aryl radicals. For convenience the term "substituted amino groups" is used in this specification and claims to denote amino groups substituted by alkyl radicals (such as, the methyl radical) and by aryl radicals (such as, the phenyl or the tolyl radicals). In connection with the term "sulfonated anthraquinone dyestuffs" it will be understood that the sulfonic acid groups in the dyestuffs denoted by this term may be in the anthraquinone nucleus, in an N-aryl nucleus, or in both.

While it is not intended to limit the invention to any theoretical explanation, it appears probable that a reaction occurs between the xanthinic base and the dyestuff when a mixture of these materials is mixed with water, to form a complex reaction product that is more soluble, particularly in hot acid aqueous media, than the dyestuff itself. Whatever the explanation, the compositions prepared in accordance with the present invention, from sulfonated anthraquinone dyestuffs possessing such low solubility as to make them difficult to use in the conventional printing pastes, may be used in such pastes to produce excellent prints on fibers for which dyestuffs of this class have affinity.

The invention is illustrated by the following examples in which the parts are by weight.

EXAMPLE 1

11 parts of the commercial preparation of the blue wool dyestuff having the chemical constitution 1-amino-2-sulfo-4-anilido-anthraquinone, which preparation contains about 93 parts pure dyestuff, are mixed intimately with 50 parts crude caffeine. The mixture is a dry powder which, when heated in water at a temperature between about 70° C. and boiling, appears to form a complex which is very soluble in water and is not precipitated from the solution by additions of alkali, salts, or organic acids. 6 parts of the dry mixture of the blue dyestuff and caffeine are added to 59 parts hot water (about 70° C. or higher), and the resulting solution is mixed with 60 parts gum tragacanth (6 per cent) and 3 parts formic acid, making a total of 128 parts. 128 ounces of this mixture are diluted to 1 gallon with water to form a 6 ounce per gallon printing composition which is applied in the usual manner to print woolen goods. The prints are dried carefully, then steamed for one-half hour with moist steam at 3 pounds pressure, washed in water, lightly soaped, rinsed, and dried. The resulting prints are characterized by excellent uniformity, fastness and depth of shade.

The caffeine addition to the dyestuff yields a dyestuff complex which is sufficiently soluble even in the presence of formic acid to yield excellent prints on wool in light and heavy shades. Without the assistance of the caffeine, the foregoing printing paste yields unsatisfactory, uneven and specky prints.

EXAMPLE 2

4 ounces of the dry mixture of commercial 1-amino-2-sulfo-4-anilido-anthraquinone and caffeine prepared in Example 1 are added to 61 ounces of hot water, 3 ounces formic acid and gum tragacanth, 6 per cent, to make a paste weighing 128 ounces. This paste is diluted with water to 1 gallon to make a suitable 4 ounce per gallon printing paste.

EXAMPLE 3

A 3 ounce per gallon composition is made by mixing 64 ounces of the undiluted printing paste of Example 1 with 64 ounces of gum tragacanth 3 per cent, and diluting the resulting mixture with water to 1 gallon.

The prints made with printing pastes using these compositions are uniform and free from specks and uneven coloring which are common in prints made with similar pastes but devoid of caffeine or a similar xanthinic base solubilizing agent.

In the following examples printing pastes containing Alizarine Sapphire SE (Color Index 1053) are described. The pastes are used in the following manner: The pastes are printed on woolen goods, dried, then steamed for one-half hour at 5 pounds pressure, soaped lightly, rinsed and dried. Excellent prints are obtained in this manner. Without the caffeine in these compositions, the pastes are unsatisfactory for printing purposes.

In these examples the ingredients listed are mixed to form a mixture which is then diluted with such an amount of water that a paste is formed containing 128 ounces of the mixture for each gallon of paste. The paste in each case has the indicated dye strength.

EXAMPLE 4

5 ounces per gallon paste

| | Parts |
|---|---|
| Alizarine Sapphire SE | 5 |
| Caffeine crude | 1½ |
| Hot water | 58½ |
| Formic acid | 3 |
| Gum tragacanth | 60 |
| Total | 128 |

EXAMPLE 5

3 ounces per gallon paste

| | Parts |
|---|---|
| Alizarine Sapphire SE | 3 |
| Caffeine crude | 1 |
| Hot water | 61 |
| Formic acid | 3 |
| Gum tragacanth | 60 |
| Total | 128 |

It will be understood that the above examples are merely illustrative of the invention. Below are given additional examples of sulfonated anthraquinone dyestuffs that can be solubilized by treatment with a xanthinic base, particularly caffeine, to yield compositions that are soluble in hot water and at concentrations that are suitable for printing pastes. The compositions do not precipitate from their hot aqueous solutions on cooling nor on acidifying these solutions with organic acids. These dyestuffs are: 1,4-di(2'-sulfo-p-toluido)-anthraquinone (Color Index No. 1078); 1,5 - dihydroxy-4,8-diamino - 2 - sulfo-anthraquinone (Color Index No. 1054); 1-amino-2-sulfo-4-(3'-sulfo-p-toluido)-anthraquinone; 1-amino-2-sulfo-4-(4' - methylamido - anilido) - anthraquinone; 1 - amino - 2-brom-4-(2'-sulfo-p-toluido)-anthraquinone (Color Index No. 1088); 1-methylamino - 4 - (2'-sulfo-p-toluido)-anthraquinone (Color Index No. 1075); 1-hydroxy-4-(2'-sulfo-p-toluido)-anthraquinone (Color Index No. 1073); 1 - amino - 2 - methoxy-4-sulfo-p-toluido-anthraquinone. Also the sulfonated anthraquinone dyestuffs of the following Color Index Nos. can be treated in accordance with the present process to give improved compositions: Color Index Nos. 1034, 1036, 1044, 1047, 1048, 1049, 1053, 1054, 1055, 1056, 1057, 1058, 1059, 1060, 1061, 1063, 1067, 1068, 1070, 1071, 1072, 1074, 1076, 1077, 1079, 1080, 1081, 1082, 1083, 1084, 1085, 1086, 1087, 1079, 1091, and 1092.

I claim:

1. A composition comprising a xanthinic base and a sulfonated anthraquinone dyestuff containing at least two substituents in the anthraquinone nucleus selected from the group consisting of hydroxyl, amino and substituted amino groups.

2. A composition comprising caffeine and a sulfonated anthraquinone dyestuff containing at least two substituents in the anthraquinone nucleus selected from the group consisting of hydroxyl, amino and substituted amino groups.

3. A composition comprising crude caffeine and a sulfonated anthraquinone dyestuff containing at least two substituents in the anthraquinone nucleus selected from the group consisting of hydroxyl, amino and substituted amino groups.

4. A composition for printing animal fibers comprising a sulfonated anthraquinone dyestuff containing at least two substituents in the anthraquinone nucleus selected from the group consisting of hydroxyl, amino and substituted amino groups, and about an equimolar proportion of an xanthinic base.

5. A composition for printing animal fibers comprising a sulfonated anthraquinone dyestuff having at least two substituents in the anthraquinone nucleus selected from the group consisting of hydroxyl, amino and substituted amino groups, and about an equimolar proportion of caffeine.

6. A composition for printing animal fibers comprising a sulfonated anthraquinone dyestuff having at least two substituents in the anthraquinone nucleus selected from the group consisting of hydroxyl, amino and substituted amino groups, about an equimolar proportion of crude caffeine, and a thickener.

7. A composition for printing animal fibers comprising 1-amino-2-sulfo-4-anilido-anthraquinone and a xanthinic base.

8. A composition for printing animal fibers comprising 1-amino-2-sulfo-4-anilido-anthraquinone, caffeine, a thickener and an acid.

9. A printing paste composition comprising 1-amino - 2 - sulfo - 4 - anilido-anthraquinone and caffeine in approximately equimolar proportions.

10. A printing paste composition comprising 1 - amino-2-sulfo-4-anilido-anthraquinone and caffeine in approximately equimolar proportions, a thickener, and an organic acid.

11. A composition comprising 1,4-di(2'-sulfo-p-toluido)-anthraquinone and a xanthinic base.

12. A printing composition comprising 1,4-di(2'-sulfo-p-toluido)anthraquinone and caffeine.

13. A printing composition comprising 1,4-di(2'-sulfo-p-toluido)-anthraquinone and caffeine in approximately equimolar proportions.

14. A process of solubilizing a sulfonated anthraquinone dyestuff containing at least two substituents in the nucleus selected from the group consisting of hydroxyl, amino and substituted amino groups which comprises mixing a xanthinic base with said dyestuff.

15. A process of solubilizing a sulfonated anthraquinone dyestuff containing at least two substituents in the nucleus selected from the group consisting of hydroxyl, amino and substituted amino groups which comprises mixing caffeine with said dyestuff.

16. A process of solubilizing 1-amino-2-sulfo-4-anilido-anthraquinone which comprises adding caffeine thereto.

17. A process of solubilizing 1,4-di(2'-sulfo-p-toluido)-anthraquinone which comprises adding caffeine thereto.

ROBERT C. HOARE.